United States Patent [19]

Seamans et al.

[11] Patent Number: 4,943,547

[45] Date of Patent: Jul. 24, 1990

[54] METHOD OF PRESULFIDING A HYDROTREATING CATALYST

[76] Inventors: James D. Seamans, 1 Cormac Ct., Reisterstown, Md. 21136; James G. Welch, 107 Fireside Cir., Baltimore, Md. 21212; Neal G. Gasser, 508 Windy Knoll Dr., Mt. Airy, Md. 21771

[21] Appl. No.: 243,687

[22] Filed: Sep. 13, 1988

[51] Int. Cl.$^5$ .................. B01J 27/051; B01J 27/049; B01J 27/047; K10G 45/08
[52] U.S. Cl. .................. 502/150; 208/216 R; 208/217; 502/214; 502/220; 502/221
[58] Field of Search .............. 502/219, 220, 221, 150

[56] References Cited

U.S. PATENT DOCUMENTS

| | | | |
|---|---|---|---|
| 2,038,599 | 4/1936 | Pier et al. | 196/53 |
| 2,232,909 | 2/1941 | Gohr | 502/220 |
| 2,402,683 | 6/1946 | Kerr | 502/221 |
| 3,383,301 | 5/1968 | Beuther et al. | |
| 3,898,183 | 8/1975 | Sugier et al. | |
| 4,089,930 | 5/1978 | Kittrell et al. | |
| 4,177,136 | 12/1979 | Herrington et al. | |
| 4,368,141 | 1/1983 | Kukes | |
| 4,525,472 | 6/1985 | Morales et al. | 502/306 |
| 4,530,917 | 7/1985 | Berrebi | |
| 4,548,920 | 10/1985 | Thompson et al. | 502/219 |
| 4,588,709 | 5/1986 | Morales et al. | 502/314 |
| 4,719,195 | 1/1988 | Toulhoat et al. | 502/216 |
| 4,725,569 | 2/1988 | Tuszynski et al. | 502/168 |
| 4,725,571 | 2/1988 | Tuszynski et al. | 502/220 |

FOREIGN PATENT DOCUMENTS

| | | |
|---|---|---|
| 759938 | 5/1967 | Canada . |
| 1220188 | 11/1983 | Canada . |
| 7703594 | 10/1977 | Netherlands .......... 502/220 |

OTHER PUBLICATIONS

"Experience Reveals Best Presulfiding Techniques for HDS and HDN Catalysts", Harman Hallie, Oil & Gas Journal, Dec. 20, 1982.

*Primary Examiner*—Paul E. Konopka
*Attorney, Agent, or Firm*—Oliff & Berridge

[57] ABSTRACT

An improved method of presulfiding a hydrotreating catalyst which minimizes sulfur stripping upon start-up of a hydrotreating reactor utilizing such a catalyst. The method comprises the steps of contacting a hydrotreating catalyst with elemental sulfur at a temperature below the melting point of sulfur, thereby forming a sulfur-catalyst mixture, and heating the sulfur-catalyst mixture to a temperature above the melting point of sulfur. Preferably, the sulfur-catalyst mixture is first mixed with a high boiling oil or a hydrocarbon solvent to form a prewet mixture prior to heating at a temperature above the melting point of sulfur.

18 Claims, No Drawings

METHOD OF PRESULFIDING A HYDROTREATING CATALYST

FIELD OF THE INVENTION

This invention relates to a method of presulfiding a supported metal oxide catalyst for use in hydrotreating hydrocarbon feed stocks and, a hydrotreating process utilizing a presulfided metal oxide catalyst.

BACKGROUND OF THE INVENTION

A hydrotreating catalyst may be defined as any catalyst composition which may be employed to catalyze the hydrogenation of hydrocarbon feedstocks. Such catalyst compositions are well known to those of ordinary skill in the art and several are commercially available. Metal oxide catalysts which come within this definition include cobalt-molybdenum, nickel-tungsten, and nickel-molybdenum. Typical supports for hydrotreating metal oxide catalysts include alumina, silica and silica-alumina supports.

In the past, ex-situ methods of presulfiding supported metal oxide catalysts have suffered from excessive stripping of sulfur upon start-up of a hydrotreating reactor. As a result of sulfur stripping, an increase in the product weight percent of sulfur is observed along with a decrease in catalyst activity.

The use of high boiling oils and hydrocarbon solvents to aid the incorporation of sulfur into a catalyst is not believed to have been previously taught by prior presulfiding methods. Hereforth, a high boiling oil is defined as an oil whose initial boiling point is greater than 400° F.

Hydrotreating catalysts are typically presulfided by incorporating sulfur compounds into the porous catalyst prior to hydrotreating a hydrocarbon feedstock. For example, U.S. Pat. No. 4,530,917 to Berrebi discloses a method of presulfiding a hydrotreating catalyst with organic polysulfides.

U.S. Pat. No. 4,177,136 to Herrington et al discloses a method of catalyst presulfiding wherein a catalyst is treated with elemental sulfur. Hydrogen is then used as a reducing agent to convert the elemental sulfur to $H_2S$ in situ. Problems arise, however, upon start-up of a reactor due to excessive sulfur stripping.

U.S. Pat. No. 4,089,930 to Kittrell et al discloses the pretreatment of a catalyst with elemental sulfur in the presence of hydrogen.

SUMMARY OF THE INVENTION

It is an object of the present invention to presulfide a hydrotreating catalyst in a manner which minimizes sulfur stripping upon start-up of a hydrotreating reactor.

It is yet a further object of the present invention to activate spent catalyst in such a manner as to minimize the amount of sulfur required for activation.

It is yet a further object of the present invention to prepare a safe, stable, presulfided hydrotreating catalyst.

It is yet a further object of the present invention to provide a technique for activating a presulfided hydrotreating catalyst in-situ.

The present invention relates to an improved method of presulfiding a hydrotreating catalyst which minimizes sulfur stripping upon start-up of a hydrotreating reactor and improves catalyst activity. The catalyst is preferably presulfided by one of two methods. The first method comprises the steps of (a) contacting the supported metal oxide catalyst with powdered elemental sulfur, to form a mixture, at a temperature below the melting point of sulfur, (b) contacting the resultant mixture with a high boiling oil or a hydrocarbon solvent in a hydrogen-free environment, and (c) heating said mixture to a temperature above the melting point of sulfur.

The second method comprises the steps of (a) preparing a mixture of elemental sulfur and a high boiling oil or hydrocarbon solvent at a temperature below the melting point of sulfur, (b) contacting the supported metal oxide catalyst with the mixture to form a resultant catalyst mixture, and (c) heating the resultant catalyst mixture to a temperature above the melting point of sulfur.

Alternatively, the catalyst is mixed with elemental sulfur at a temperature below the melting point of sulfur and then heated, in the absence of oil and hydrocarbon solvents to a temperature above the melting point of sulfur but below temperatures where activity loss is observed.

DESCRIPTION OF THE PREFERRED EMBODIMENTS

Several techniques may be employed to contact sulfur with catalyst particles. The use of solid sulfur eliminates many hazards such as flammability and toxicity, which are encountered when using $H_2S$, liquid sulfides, polysulfides and/or mercaptans. Powdered sulfur may be physically mixed with the catalyst particles prior to loading the catalyst particles in a reactor. The elemental sulfur and the catalyst particles may be mixed together at a temperature below the melting point of sulfur, preferably in the range of from 180° F. to 210° F. In this temperature range, the elemental sulfur sublimes and is incorporated into the pores of the catalyst particles where, upon cooling, it condenses. The sulfur-catalyst mixture is then heated to a temperature above the melting point of sulfur preferably in the range of from 250° F. to 390° F. In the presence of hydrogen, activation of the catalyst takes place. That is, the metal oxides react with substantially all of the sulfur incorporated into the catalyst pores, thus producing $H_2S$ and metal sulfides.

Mixing times for the powdered elemental sulfur and the catalyst can be minimized by heating the mixture at higher temperatures, within specified limitations, due to the increased vapor pressure of the sulfur. Preferably the amount of sulfur employed is 2 to 15% by weight of the catalyst charged. Most preferably, the amount of sulfur employed is about 6% to 8% by weight of the catalyst charged. Mixing times of the powdered sulfur and the catalyst particles are also minimized due to the reduced quantity of sulfur. While the use of greater amounts of sulfur does result in more sulfur being incorporated into the pores of the catalyst, the amount of sulfur stripping during reactor start-up is much greater than that of a 6 to 8% charge. When 6 to 8% sulfur by weight is employed, a minimum stripping effect is observed upon reactor start-up.

A significant aspect of the present invention is that improved results are obtained when catalyst presulfiding is accomplished by mixing the catalyst particles with powdered elemental sulfur and sequentially or simultaneously contacting the sulfur-catalyst mixture with a high boiling oil or hydrocarbon solvent and heating to a temperature above the melting point of sulfur. Hereforth, this step will be referred to as prewetting. Subsequent activity tests on catalysts produced using such a technique have shown excellent results.

Various high boiling oils and hydrocarbon solvents may be used as prewetting agents according to the claimed invention. Good results have been achieved when using oils with boiling ranges from approximately 700° F. to 1000° F. In particular, vacuum gas oils with low sulfur contents have been shown to be successful.

If the prewetting step is independent of mixing the powdered sulfur with the catalyst, it may be performed in-situ or off-site of the reactor. If prewetted in-situ, the feedstock used in the reactor can be used as the prewetting oil, minimizing costs for the refinery.

According to one embodiment of the present invention, catalyst particles are sequentially contacted with first, elemental sulfur, then an oil or solvent. The catalyst particles are contacted with the powdered elemental sulfur at a temperature below the melting point of sulfur and preferably in the range of from 180° F. to 210° F. The catalyst and the sulfur are then mixed for a sufficient amount of time to allow incorporation of the sulfur into the catalyst pores. A catalyst-sulfur mixture is thus produced. To this mixture a high boiling oil or hydrocarbon solvent is added thus producing a prewet mixture. The prewet mixture is preferably further heated to a temperature above the melting point of sulfur. Most preferably, to a temperature in the range of 250° F. to 450° F. The presulfided prewet catalyst so prepared may be conveniently activated by heating in the presence of hydrogen.

In another embodiment according to the present invention, the catalyst particles are contacted with both the powdered elemental sulfur and the high boiling oil or hydrocarbon solvent simultaneously. According to this method, a mixture of elemental sulfur and a high boiling oil or hydrocarbon solvent is first produced. A ratio of approximately 4:1 oil to sulfur by weight is preferred. The mixture is then heated to approximately 100° F. to promote homogenous mixing of the components. Toluene or other light weight hydrocarbon solvents may be added to decrease the viscosity of the mixture. Also, increased heat will achieve the same effect. The mixture is then added to a preweighed catalyst sample and mixed.

In a preferred embodiment, catalyst particles prewet by the simultaneous method described above are further heat treated at a temperature in the range of from 250° F. to 450° F. under a nitrogen atmosphere or other inert atmosphere.

Results of activity tests have shown that mixing the sulfur-catalyst particles with a high boiling oil or hydrocarbon solvent in an inert environment and heating to a temperature above the melting point of sulfur most significantly minimizes sulfur stripping upon reactor start-up. The elemental sulfur by itself was found to indeed presulfide the catalyst metals with only oil and hydrogen present and no other form of sulfur required. Alternatively, the catalyst may be activated with hydrogen at a later step, independent of mixing with a prewetting fluid.

A versatile hydrotreating catalyst which shows good activity under various reactor conditions is a nickel-molybdenum catalyst. Cobalt-molybdenum and nickel-tungsten catalysts are also preferred although many other metal oxide catalysts may be presulfided according to the claimed invention.

The processes of the present invention are further applicable to the sulfiding of spent catalysts which have been oxy-regenerated. After a conventional oxy-regeneration process, an oxy-regenerated catalyst may be presulfided as would fresh catalyst in the manner set forth above and specifically in a manner set forth by way of the following examples.

EXAMPLES

The following Examples further illustrate the practice and advantages of specific embodiments of the claimed invention. These Examples are illustrative only; in no event are they to be considered as limiting the scope of the claimed invention.

EXAMPLE I

Standard Method

A sample of a Nickel-Molybdenum catalyst was dried at 700° F. for one hour and then cooled to ambient under vacuum. The sample was then placed in a flask and enough elemental sulfur was added to produce a sulfur level of 6%. The flask was then sealed and placed in a 231° F. oven for one hour. During this time period, the flask was rotated continually to provide uniform distribution of sulfur. The final sulfur level was 6% sulfur.

EXAMPLE IIA

Standard Method and Simultaneous Prewet

A sample of a Nickel-Molybdenum catalyst was dried at 700° F. for one hour and then cooled to ambient under vacuum.

Into a beaker the following were added:
(1.) 60.89 grams of a Vacuum Gas Oil Feedstock;
(2.) 14.10 grams of Elemental Sulfur.

The mixture was heated to 102° F. and mixed. The mixture was removed from the heat and 15.51 grams of toluene were added and mixed.

To a preweighed catalyst sample (159.6 grams), 72.02 grams of the above mixture were added. The container was then sealed and mixed by shaking. The container was reopened and placed under vacuum for 16 hours to gently remove the majority of the toluene. The final sulfur level was 4.5% sulfur.

EXAMPLE IIB

Standard Method and Sequential Prewet

A sample of a Nickel-Molybdenum catalyst was dried at 700° F. for one hour and then cooled to ambient under vacuum. The sample was then placed in a flask and enough elemental sulfur was added to produce a sulfur level of 6.6%. The flask was then sealed and placed in a 231° F. oven for one hour. During this time period, the flask was rotated continually to provide uniform distribution of sulfur.

Into a beaker the following were added:
(1) 35.01 grams of a vacuum gas oil feedstock
(2) 8.92 grams of toluene The contents of the mixture were then mixed.

To a preweighed sample of the above sulfur-impregnated catalyst (42.72 grams), 15.28 grams of the prepared oil-toluene mixture were added. The container was then sealed and mixed by shaking. The container was reopened and placed under vacuum for 16 hours to gently remove the majority of the toluene. The final sulfur level was 5.5% sulfur.

EXAMPLE III

Standard Method, Simultaneous Prewet and Heat

The catalyst prepared in Example IIA was heat treated at 392° F. for one hour under a nitrogen blanket. The sample was also cooled under a nitrogen blanket. The final sulfur level was 4.9%. It is expected that the Standard Method, Sequential Prewet and Heat would produce comparable results.

Activity tests were conducted on catalysts prepared according to Examples I-III. Oxide catalysts which were not presulfided were also tested as controls for each start-up procedure.

Three start-up procedures were used in testing the activity of each presulfided catalyst.

| Fast Oil Start-Up | |
|---|---|
| Catalyst Charge: | 48 cc + diluent |
| Reactor Pressure: | 700 psig |
| H$_2$ Flow Rate: | 1000 SCF/Bbl |
| Liquid Feed: | Diesel Fuel |
| | Sulfur = 0.17 wt. % |
| | 31.1° API |
| LHSV = | 1.5 hr$^{-1}$ |
| | (approx. 63 gms/hr.) |

The hydrogen feed rate and reactor pressure are established at ambient temperature. The liquid feed is introduced and the reactor temperature is increased to 250° F. during the first hour on stream. The reactor temperature is then increased at a rate of about 45° F./hour to 650° F. The reactor is then allowed to cool to 475° F. during the next two hours. Once the reactor is at 475° F., the diesel is discontinued and the standard 1.8 wt. % sulfur gas oil feedstock is started. Standard run conditions, heating rate, etc. followed. The standard gas oil feedstock consists of ⅔ vacuum gas oil and ⅓ light cycle oil. The API gravity is 21.6°, the weight percent Sulfur is 1.8% and the Total Nitrogen content is 880 ppm. Standard run conditions are:

| Reactor Temperature: | 625° F. |
|---|---|
| Reactor Pressure: | 700 psig |
| LHSV: | 1.5 hr$^{-1}$ |
| H$_2$ Flow Rate: | 1000 SCF/Bbl |
| Slow Oil Start-Up | |
| Catalyst Charge: | 48 cc + diluent |
| Reactor Pressure: | 700 psig |
| H$_2$ Flow Rate: | 1000 SCF/BbL |
| Liquid Feed: | 62 gms./hr of Diesel Oil |
| LHSV = | 1.5 hr$^{-1}$ |
| | (approx. 62 gms/hr.) |

The reactor pressure, hydrogen flow rate and liquid feed rate are established at ambient temperature. The reactor temperature was increased at a rate of 24° F./hour to 650° F. When the reactor temperature reached 650° F., the heat was cut off and the temperature was reduced to 475° F. Immediately following the cut off of heat, the diesel oil was drained from the feed tank and the standard 1.8 wt. % Sulfur feedstock was charged. Standard run conditions, heating rate, etc. followed.

| Hydrogen Start-Up (Feed in at 550° F.) | |
|---|---|
| Catalyst Charge: | 48 cc + diluent |
| Reactor Pressure: | 700 psig |
| H$_2$ Flow Rate: | 0.467 SCFH |
| Liquid Feed: | 0.0 gms/hr |

The reactor was heated at a rate of 50° F./hr until a temperature of 625° F. was reached. During this heat up period, liquid feed was introduced when the reactor temperature reached 550° F. at a feed rate of 65 gms/hr.

In certain start-up situations, the standard method presulfided catalysts have difficulties. With the slow diesel start-up, excessive sulfur is displaced from the catalyst resulting in less activity. With the hydrogen to 550° F. start-up, the standard method presulfided catalysts yield poor results because of the exposure to hydrogen at high temperature without a hydrocarbon present. The modified procedures of the simultaneous and sequential prewet methods with and without heat overcome these difficulties by producing a catalyst that can tolerate a wide range of conceivable start-up procedures.

The results presented below are for the three different types of start-up procedures. The test results verify that the use of vacuum gas oil and heat most greatly reduce the weight percent of sulfur in the product.

| | Product Sulfur w % | Product Total Nitrogen ppm |
|---|---|---|
| Fast Oil Start-Up | | |
| Oxide catalyst | 0.68-0.69 | 640-660 |
| Example 1 | 0.54-0.58 | 560-600 |
| Slow Oil Start-Up | | |
| Oxide catalyst | 0.68-0.69 | 640-660 |
| Example I | 0.67 | 633 |
| Example IIA | 0.61 | 616 |
| Example IIB | 0.61 | 610 |
| Example III | 0.57 | 585 |
| Hydrogen Start-Up (Feed in at 550° F.) | | |
| Oxide catalyst | 0.65 | 625 |
| Example I | 0.71-0.84 | 620-700 |
| Example IIA | 0.58 | 595 |
| Example IIB | 0.60-0.63 | 580-600 |
| Example III | 0.57 | 550 |

The present invention has been described in some detail, including alternative embodiments thereof. It will be appreciated, however, that those skilled in the art, upon consideration of the present disclosure, may make modifications and improvements on this invention and still be within the scope and spirit of this invention as set forth in the following claims.

What is claimed is:

1. A method of presulfiding a hydrotreating metal oxide catalyst comprising the steps of:
   (a) contacting said catalyst with powdered elemental sulfur at a temperature below the melting point of sulfur such that said elemental sulfur sublimes and is substantially incorporated in the pores of said catalyst, thereby forming a mixture, and
   (b) heating said mixture in the presence of hydrogen to a temperature above the melting point of sulfur and below 390° F. for a timer period long enough for substantially all of the sulfur incorporated into the catalyst pores to have reacted to produce metal sulfides and hydrogen sulfides and to achieve a final sulfur level sufficient to sulfide active and promot metal in said catalyst.

2. The method of claim 1, wherein said catalyst contains at least one element selected from the group consisting of Co, Mo, Ni and W.

3. The method of claim 1, wherein the amount of elemental sulfur mixed with said catalyst is from 2 to 15% the weight of said catalyst.

4. The method of claim 1, wherein said elemental sulfur is about 6% to 8% the weight of said catalyst.

5. A method of presulfiding a hydrotreating metal oxide catalyst comprising the steps of:
   (a) contacting said catalyst with powdered elemental sulfur at a temperature below the melting point of sulfur such that said elemental sulfur sublimes and is substantially incorporated in the pores of said catalyst;
   (b) mixing said sulfur-incorporated catalyst with at least one member selected from the group consisting of hydrocarbon solvents and high boiling oils, thereby producing a prewet mixture, for a time period long enough such that in the presence of hydrogen substantially all of the sulfur incorporated into the catalyst pores can react to produce metal sulfides and hydrogen sulfides and achieve a final sulfur level sufficient to sulfide active and promoter metals in said catalyst.

6. A method as in claim 5, wherein said method further comprises the step of exposing said prewet mixture to hydrogen.

7. The method of claim 5, wherein said method further comprises heating said prewet mixture to a temperature above the melting point of sulfur.

8. The method of claim 5, wherein said method further comprises heating the prewet mixture.

9. The method of claim 5, wherein said method further comprises contacting said catalyst with powdered elemental sulfur in the absence of oxygen.

10. The method of claim 9, wherein said method further comprises contacting said catalyst with said powdered elemental sulfur in the presence of an inert gas.

11. The method of claim 5, wherein said catalyst contains at least one element selected from the group consisting of Co, Mo, Ni and W.

12. The method of claim 5, wherein the amount of elemental sulfur mixed with said catalyst is from 2 to 15% the weight of said catalyst.

13. The method of claim 12, wherein said elemental sulfur is about 6% the weight of said catalyst.

14. The method of claim 5, wherein said member is a hydrocarbon feedstock.

15. A method of presulfiding a hydrotreating metal oxide catalyst comprising the steps of:
   (a) preparing a presulfiding suspension by mixing together powdered elemental sulfur and one member selected from the group consisting of high boiling oils and hydrocarbon solvents, so that a presulfiding suspension containing elemental sulfur results wherein a portion of said elemental sulfur remains in a particular form,
   (b) heating said suspension to a temperature below the melting point of sulfur, and
   (c) contacting a hydrotreating metal oxide catalyst with said suspension in a manner and for a time period long enough such that said elemental sulfur is substantially incorporated into the pores of said catalyst and for a time period long enough such that in the presence of hydrogen substantially all of the sulfur incorporated into the pores of said catalyst can react to produce metal sulfides and hydrogen sulfides and achieve a final sulfur level sufficient to sulfide active and promoter metals in said catalyst.

16. A method as in claim 15, wherein said method further comprises the step of exposing said catalyst contacted with said suspension to hydrogen.

17. The method of claim 15, wherein said method further comprises heating said catalyst, after contacting with said mixture, to a temperature above the melting point of sulfur.

18. A mixture comprising a metal oxide catalyst and a suspension, wherein said suspension comprises:
   an amount of elemental sulfur sufficient to sulfide active and promoter metals in said catalyst upon exposure to hydrogen; and
   an amount of a hydrocarbon solvent or high boiling oil which can be substantially incorporated into said catalyst.

* * * * *

UNITED STATES PATENT AND TRADEMARK OFFICE
CERTIFICATE OF CORRECTION

PATENT NO. : 4,943,547

DATED : July 24, 1990

INVENTOR(S) : SEAMANS et al

It is certified that error appears in the above-identified patent and that said Letters Patent is hereby corrected as shown below:

Inventor Information, Item [76], line 6 after "21771", please insert --; Charles Terrell Adams, 739 Bison, Houston, TX. 77079--.

Signed and Sealed this

First Day of October, 1991

Attest:

HARRY F. MANBECK, JR.

Attesting Officer

Commissioner of Patents and Trademarks